(12) United States Patent
Bridges

(10) Patent No.: US 11,435,010 B1
(45) Date of Patent: Sep. 6, 2022

(54) HOSE STAND ASSEMBLY

(71) Applicant: Harry Bridges, Charlotte, NC (US)

(72) Inventor: Harry Bridges, Charlotte, NC (US)

(*) Notice: Subject to any disclaimer, the term of this patent is extended or adjusted under 35 U.S.C. 154(b) by 0 days.

(21) Appl. No.: 17/344,811

(22) Filed: Jun. 10, 2021

(51) Int. Cl.
F16L 1/024 (2006.01)
F16L 3/015 (2006.01)
F16L 3/10 (2006.01)
E03F 1/00 (2006.01)
F16L 3/20 (2006.01)

(52) U.S. Cl.
CPC ............. *F16L 3/015* (2013.01); *E03F 1/008* (2013.01); *F16L 1/0246* (2013.01); *F16L 3/1075* (2013.01); *F16L 3/20* (2013.01)

(58) Field of Classification Search
CPC ....... F16L 3/015; F16L 1/0246; F16L 3/1075; F16L 3/20; E03F 1/008
USPC .................................. 248/75, 80, 81, 230.4
See application file for complete search history.

(56) References Cited

U.S. PATENT DOCUMENTS

| 1,853,010 | A | * | 4/1932 | Wray | F16L 3/1075 248/62 |
| 2,395,745 | A | * | 2/1946 | King | F16L 21/005 285/367 |
| 2,736,525 | A | * | 2/1956 | Jones | F16L 3/00 248/83 |
| 2,846,168 | A | | 8/1958 | Schroeter | |
| 3,493,204 | A | | 2/1970 | Prouty | |
| 3,730,228 | A | * | 5/1973 | Gibbs, Sr. | F16L 7/00 138/106 |
| 3,809,348 | A | * | 5/1974 | Di Laura | F16L 3/00 248/49 |
| 3,819,137 | A | * | 6/1974 | Smith | F16L 3/16 248/167 |
| 4,706,701 | A | | 11/1987 | Cresswell | |
| 5,431,455 | A | | 7/1995 | Seely | |
| 5,653,481 | A | * | 8/1997 | Alderman | F16B 31/04 24/279 |
| 6,030,006 | A | * | 2/2000 | Lin | F16L 23/10 24/279 |
| 6,056,332 | A | * | 5/2000 | Foster | F16L 23/10 24/285 |
| 6,619,596 | B1 | | 9/2003 | Caine | |
| 6,708,377 | B2 | * | 3/2004 | Maunder | F16L 23/10 24/279 |

(Continued)

FOREIGN PATENT DOCUMENTS

| CN | 201388036 | Y | * | 1/2010 |
| CN | 109386660 | A | * | 2/2019 |
| CN | 213603509 | U | * | 7/2021 |

*Primary Examiner* — Kimberly T Wood

(57) ABSTRACT

A hose stand assembly includes a plurality of rings that is each positionable around a fuel hose. A plurality of legs is each of the legs is pivotally disposed on a respective one of the first portion and the second portion of a respective one of the rings. Each of the legs is positionable in a deployed position having each of the legs extending downwardly from the respective ring. In this way each of the legs can support the respective ring above a support surface. Thus, the rings and the legs support the fuel hose above the support surface when the fuel hose is extended through the respective ring. Moreover, each of the legs associated with each of the rings has a unique length with respect to each other to orient the fuel hose at a downward slope for enhancing the flow of fuel in the fuel hose.

10 Claims, 5 Drawing Sheets

(56) References Cited

U.S. PATENT DOCUMENTS

| | | | |
|---|---|---|---|
| 7,278,613 B2 | 10/2007 | Roy | |
| 8,196,971 B2 * | 6/2012 | Hansen | F16L 23/10 |
| | | | 285/367 |
| 8,464,986 B1 * | 6/2013 | McClure | F16B 7/0433 |
| | | | 248/74.1 |
| D736,601 S | 8/2015 | Cox | |
| 9,151,420 B2 * | 10/2015 | McKiernan | F16L 23/10 |
| 9,211,847 B1 * | 12/2015 | Cox | B60R 15/00 |
| 9,365,168 B2 | 6/2016 | Boutin | |
| 10,830,263 B2 * | 11/2020 | Logan | E21B 41/0021 |
| 2002/0185869 A1 * | 12/2002 | Lin | F16L 23/10 |
| | | | 285/410 |

* cited by examiner

HOSE STAND ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to stand devices and more particularly pertains to a new stand device for supporting a fuel hose at a downward slope. The device includes a plurality of rings that are each positionable around the fuel hose. Additionally, the device includes a plurality of legs that are each coupled to a respective one of the rings. The legs on each of the rings have a unique length with respect to each other for supporting the fuel hose at a downward slope.

(2) Description of Related Art Including Information Disclosed Under 37 CFR 1.97 and 1.98

The prior art relates to stand devices including a variety of supports that are positionable beneath a fuel hose for supporting the fuel hose at a preferred angle. The prior art discloses a fuel hose support that includes a ring through which a sewer hose can be inserted and a pair of legs that are fixedly attached to the ring for supporting the sewer hose above a support surface. In no instance does the prior art disclose a plurality of rings through which a fuel hose can be extended and a plurality of legs, each having a unique length with respect to each other, that are pivotally coupled to a respective ring for supporting a fuel hose at a downward slope.

BRIEF SUMMARY OF THE INVENTION

An embodiment of the disclosure meets the needs presented above by generally comprising a plurality of rings that is each positionable around a fuel hose. A plurality of legs is each of the legs is pivotally disposed on a respective one of the first portion and the second portion of a respective one of the rings. Each of the legs is positionable in a deployed position having each of the legs extending downwardly from the respective ring. In this way each of the legs can support the respective ring above a support surface. Thus, the rings and the legs support the fuel hose above the support surface when the fuel hose is extended through the respective ring. Moreover, each of the legs associated with each of the rings has a unique length with respect to each other to orient the fuel hose at a downward slope for enhancing the flow of fuel in the fuel hose.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
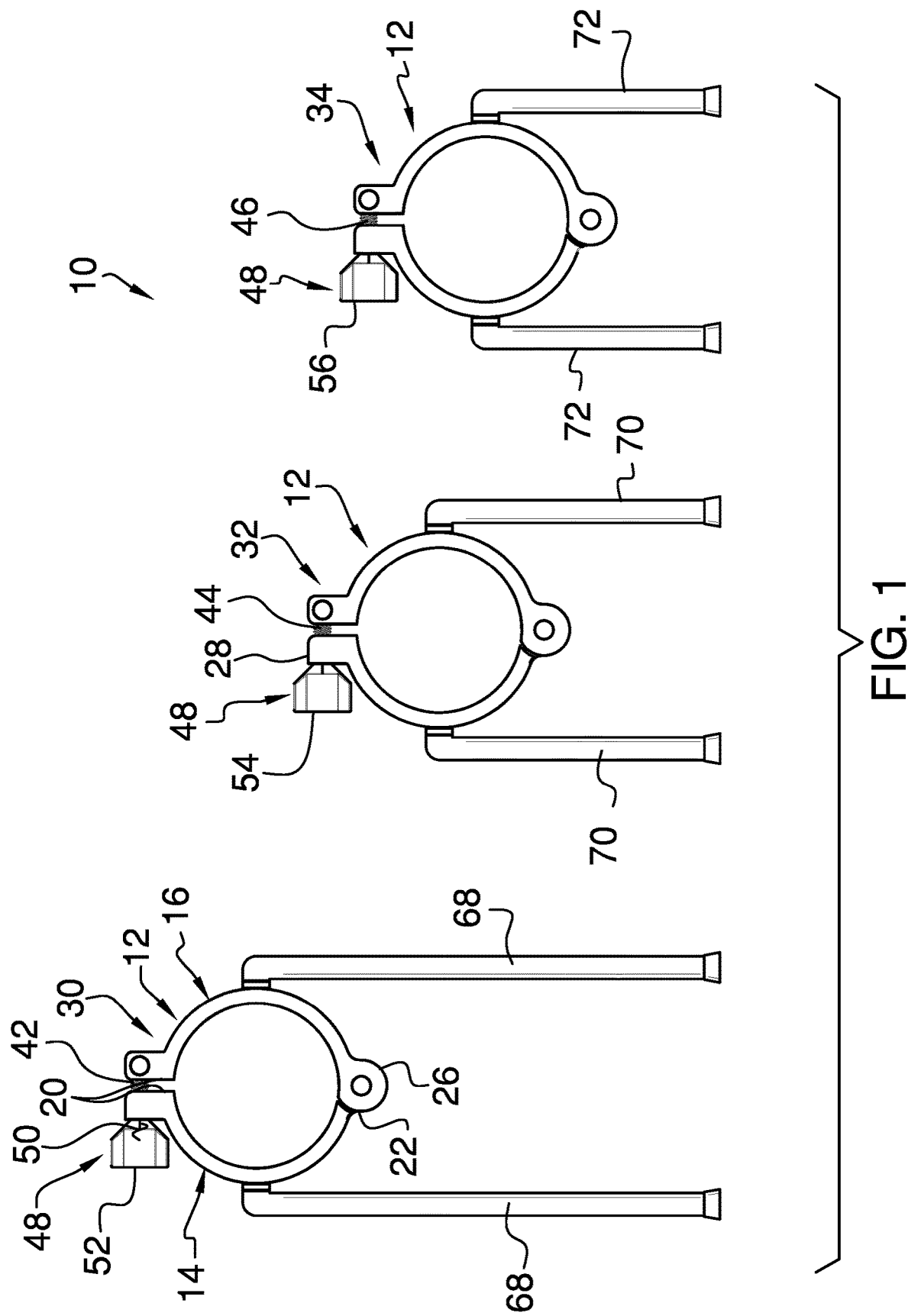
FIG. 1 is a front view of a hose stand assembly according to an embodiment of the disclosure.
Figure 2:
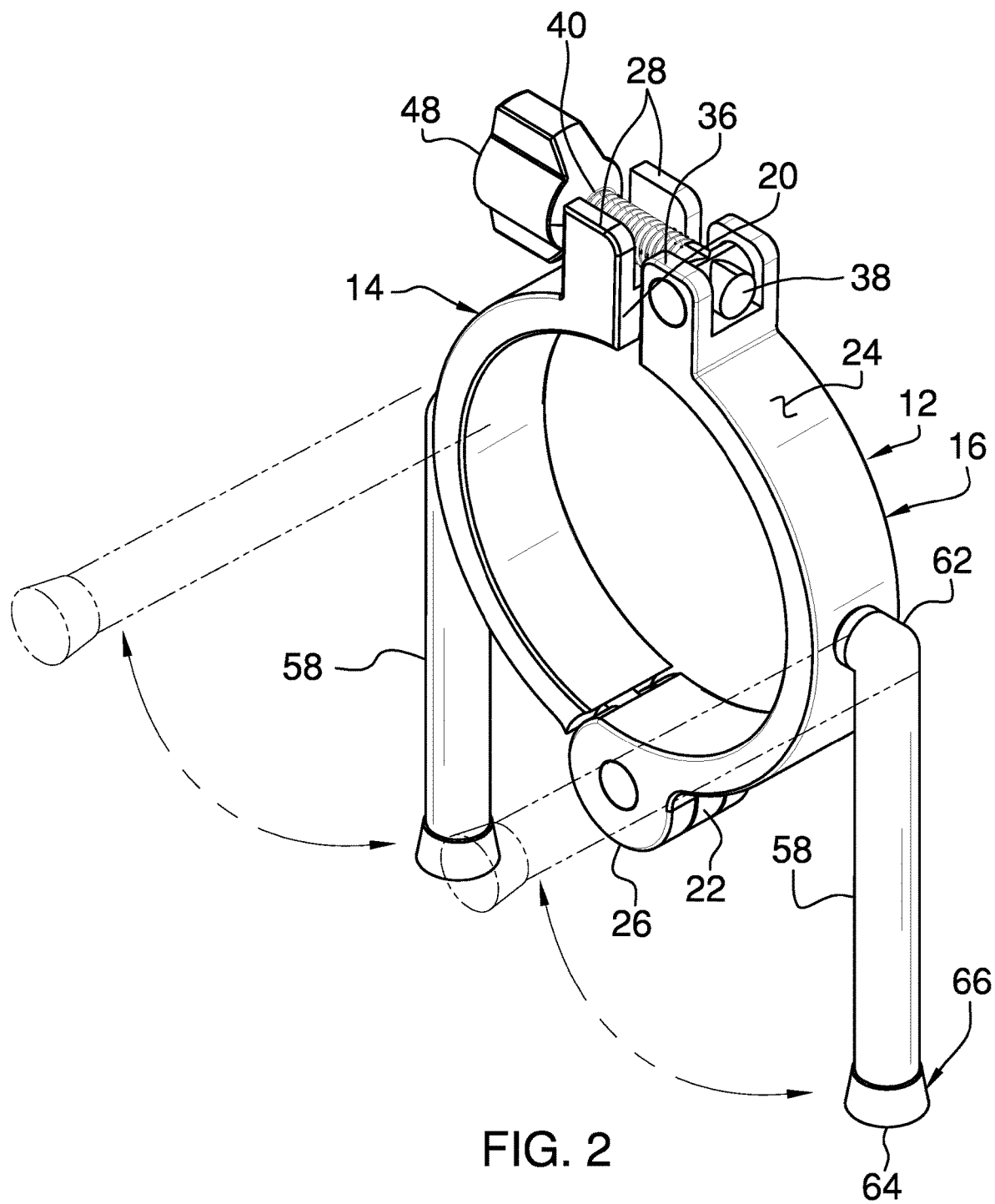
FIG. 2 is a perspective view of an embodiment of the disclosure.
Figure 3:
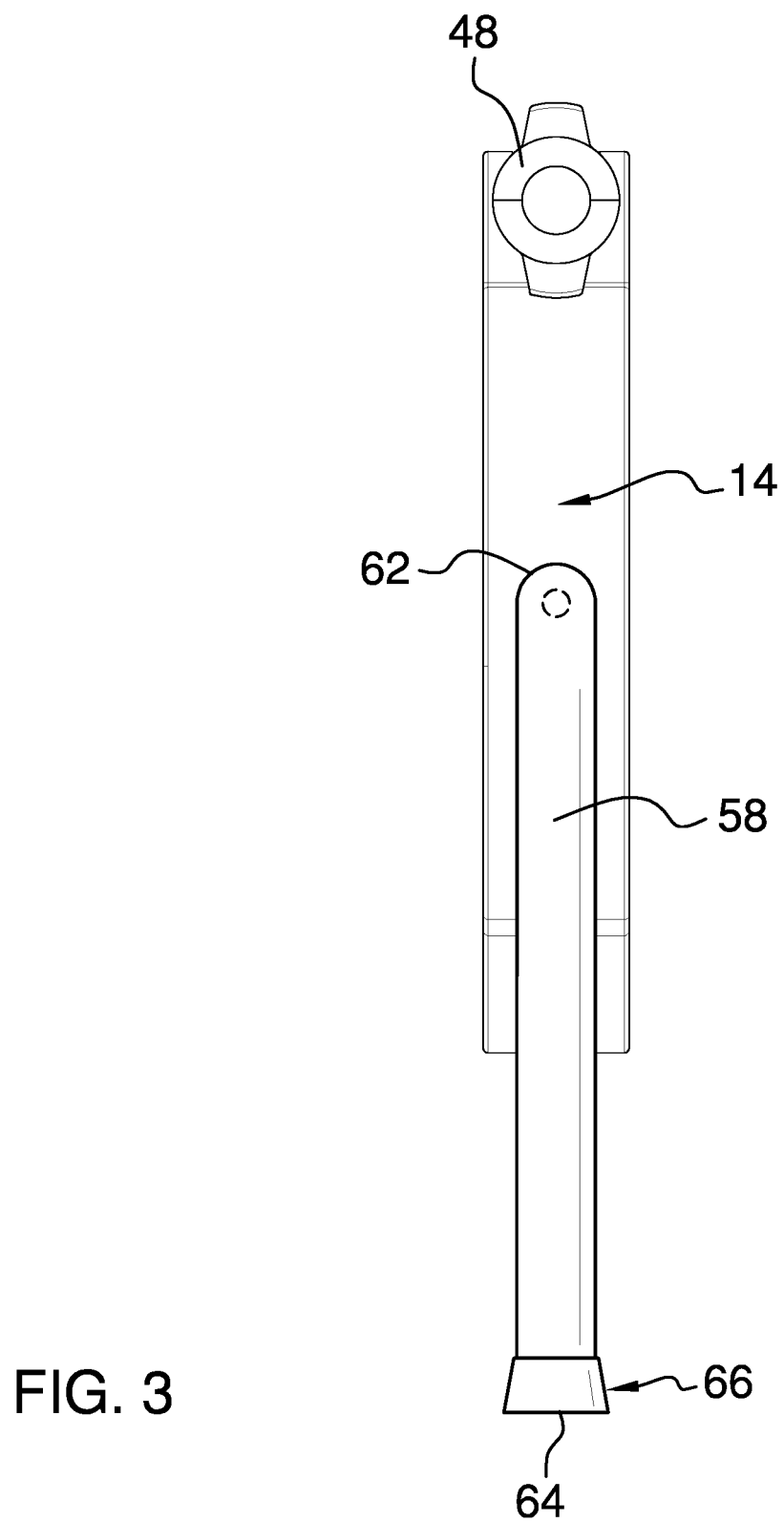
FIG. 3 is a right side view of an embodiment of the disclosure.
Figure 4:
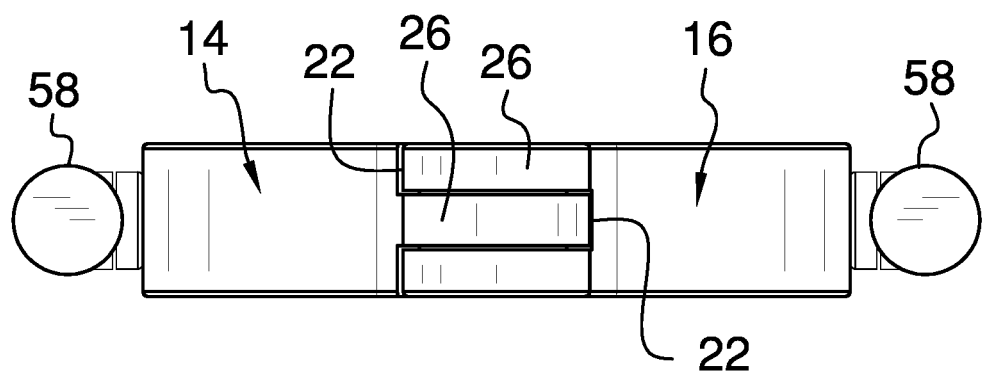
FIG. 4 is a bottom view of an embodiment of the disclosure.
Figure 5:
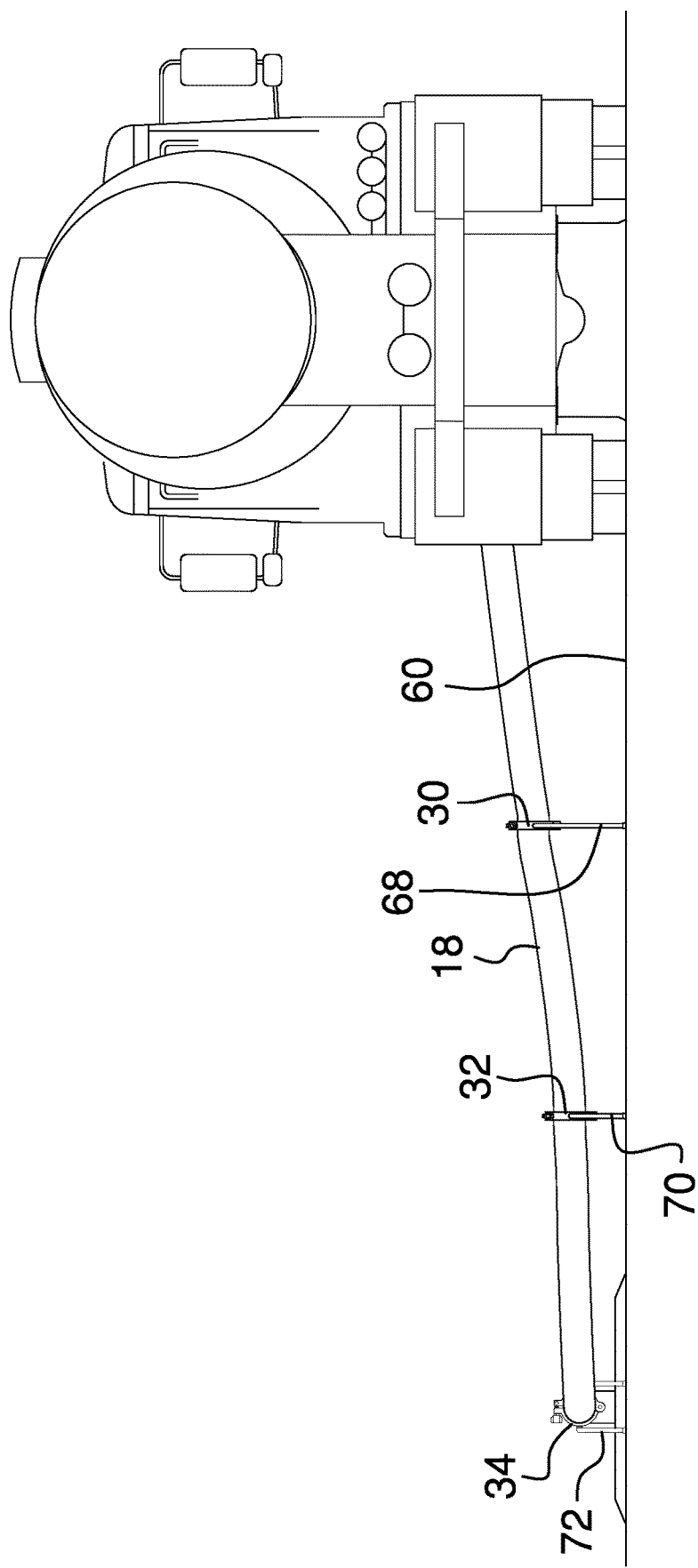
FIG. 5 is a perspective in-use view of an embodiment of the disclosure.

With reference now to the drawings, and in particular to FIGS. 1 through 5 thereof, a new stand device embodying the principles and concepts of an embodiment of the disclosure and generally designated by the reference numeral 10 will be described.

As best illustrated in FIGS. 1 through 5, the hose stand assembly 10 generally comprises a plurality of rings 12. Each of the rings 12 has a first portion 14 that is hingedly coupled to a second portion 16 such that each of the rings 12 is positionable in a closed position. In this way the rings 12 form a closed loop thereby facilitating each of the rings 12 to have a fuel hose 18 extended therethrough. The fuel hose 18 may be a fuel hose from a fuel tanker that is employed for refueling storage tanks at a gas station or other similar type of fuel hose for delivering liquid fuel in bulk. Additionally, each of the rings 12 has a diameter being greater than 4.0 inches when the rings 12 are in the closed position thereby facilitating the rings 12 to accommodate fuel hoses that are common to fuel tankers.

Each of the first portion 14 and the second portion 16 has a first end 20, a second end 22 and an outer surface 24 extending therebetween. The outer surface 24 of each of the first portion 14 and the second portion 16 is curved between the first end 20 and the second end 22 such that each of the first portion 14 and the second portion 16 forms a semicircle. The first end 20 of each of the first portion 14 and the second portion 16 comprises a lobe 26. The lobe 26 associated with the first portion 14 pivotally engages the lobe 26 associated with the second portion 16.

Each of the first portion 14 and the second portion 16 has a pair of fingers 28 each extending away from the outer surface 24. The fingers 28 on the first portion 14 are spaced apart from each other and the fingers 28 on the second portion 16 are spaced apart from each other. The fingers 28 on each of the first portion 14 and the second portion 16 are positioned adjacent to the second end 22. The plurality of rings 12 includes a first ring 30, a second ring 32 and a third ring 34.

A plurality of screws 36 is each pivotally disposed on the second portion 16 of a respective one of the rings 12. The screw 36 on a respective one of the rings 12 releasably engages the first portion 14 of the respective ring 12 for retaining the respective ring 12 in the closed position. Each of the screws 36 has a primary end 38 and a secondary end 40, and the primary end 38 of each of the screws 36 is positioned between each of the fingers 28 on the second portion 16 of the respective ring 12. Each of the screws 36 extends between the fingers 28 on the first portion 14 of the respective ring 12 when the respective ring 12 is in the closed position. The plurality of screws 36 includes a first screw 42, a second screw 44 and a third screw 46. The first screw 42 is disposed on the first ring 30, the second screw 44 is disposed on the second ring 32 and the third screw 46 is disposed on the third ring 34.

A plurality of nuts 48 is each threadably positioned on a respective one of the screws 36. Each of the nuts 48 is tightenable on the respective screw 36 to compress the first portion 14 of a respective ring 12 toward the second portion 16 of the respective ring 12 for retaining the respective ring 12 in the closed position. Each of the nuts 48 is positioned on the secondary end 40 of the respective screw 36. Each of the nuts 48 has a rear surface 50 and the rear surface 50 of each of the nuts 48 is tapered. In this way the rear surface 50 can move between each of the fingers 28 on the first portion 14 of the respective ring 12 when a respective nut 48 is tightened. Thus, the fingers 28 on the first portion 14 of the respective ring 12 are urged toward the fingers 28 on the second portion 16 of the respective ring 12.

The plurality of nuts 48 includes a first nut 52, a second nut 54 and a third nut 56. The first nut 52 is positioned on the first screw 42, the second nut 54 is positioned on the second screw 44 and the third nut 56 is positioned on the third screw 46. A plurality of legs 58 is each pivotally disposed on a respective one of the first portion 14 and the second portion 16 of a respective one of the rings 12. Each of the legs 58 is positionable in a deployed position having each of the legs 58 extending downwardly from the respective ring 12. In this way each of the legs 58 can support the respective ring 12 above a support surface 60 thereby supporting the fuel hose 18 above the support surface 60 when the fuel hose 18 is extended through the respective ring 12.

Each of the legs 58 has a top end 62 and a bottom end 64, and each of the legs 58 is pivotally coupled to the outer surface 24 of a respective one of the first portion 14 and the second portion 16 of the respective ring 12 at a point that is located adjacent to the top end 62 of the legs 58. Each of the legs 58 flares outwardly adjacent to the bottom end 64 of the legs 58 to define a foot 66 on each of the legs 58 to stabilize the legs 58 on the support surface 60. The plurality of legs 58 includes a set of first legs 68, a set of second legs 70 and a set of third legs 72. Each of the first legs 68 is positioned on the first ring 30, each of the second legs 70 is positioned on the second ring 32 and each of the third legs 72 is positioned on the third ring 34.

Each of the first legs 68 has a length that is greater than a length of the second legs 70. Each of the second legs 70 has a length that is greater than a length of the third legs 72. In this way each of the first legs 68, the second legs 70 and the third legs 72 can orient the fuel hose 18 in a downwardly sloping orientation when the fuel hose 18 is extended through each of the first ring 30, the second ring 32 and the third ring 34. Thus, the fuel hose 18 can efficiently deliver the liquid fuel into the receptacle In use, the first ring 30 is positioned around the fuel hose 18 and each of the first legs 68 is positioned in the deployed position to support the fuel hose 18 above the support surface 60. The second ring 32 is positioned around the fuel hose 18 at a point that is locate downstream from the first ring 30. Each of the second legs 70 is positioned in the deployed position to support the fuel hose 18 above the support surface 60 at a downward slope between the first ring 30 and the second ring 32. The third ring 34 is positioned around the fuel hose 18 at a point that is located downstream from the second ring 32. Each of the third legs 72 is positioned in the deployed position to support the fuel hose 18 above the support surface 60 at a downward slope between the second ring 32 and the third ring 34. In this way the fuel hose 18 is oriented at a downward slope between the fuel tanker and the receptacle to facilitate the best possible flow of the liquid fuel. Additionally, the first ring 30, the second ring 32 and the third ring 34 support the fuel hose 18 such that a fuel delivery person does not have to manually support the fuel hose 18, thereby reducing the likelihood of injury resulting from manually supporting the fuel hose 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hose stand assembly for positioning a fuel hose on a tanker in a sloped orientation during refueling procedures, said assembly comprising:
   a plurality of rings, each of said rings having a first portion being hingedly coupled to a second portion such that each of said rings is positionable in a closed position having said rings forming a closed loop wherein each of said rings is configured to have a fuel hose extended therethrough;

a plurality of screws, each of said screws being pivotally disposed on said second portion of a respective one of said rings, said screw on a respective one of said rings releasably engaging said first portion of said respective ring for retaining said respective ring in said closed position;

a plurality of nuts, each of said nuts being threadably positioned on a respective one of said screws, each of said nuts being tightenable on said respective screw to compress said first portion of a respective ring toward said second portion of said respective ring for retaining said respective ring in said closed position; and a plurality of legs, each of said legs being pivotally disposed on a respective one of said first portion and said second portion of a respective one of said rings such that said legs disposed on each ring are pivotable within respective parallel planes when said ring is in said closed position, each of said legs being positionable in a deployed position having each of said legs extending downwardly from said respective ring wherein each of said legs is configured to support said respective ring above a support surface thereby supporting the fuel hose above the support surface when the fuel hose is extended through said respective ring, each of said legs associated with each of the rings having a unique length with respect to each other thereby facilitating the fuel hose to be oriented at a downward slope wherein said plurality of rings is configured to enhance the flow of fuel in the fuel hose.

2. The assembly according to claim 1, wherein each of said first portion and said second portion has a first end, a second end and an outer surface extending therebetween, said outer surface of each of said first portion and said second portion being curved between said first end and said second end such that each of said first portion and said second portion forms a semi-circle, said first end of each of said first portion and said second portion comprising a lobe, said lobe associated with said first portion pivotally engaging said lobe associated with said second portion.

3. The assembly according to claim 2, wherein each of said first portion and said second portion has a pair of fingers each extending away from said outer surface, said fingers on said first portion being spaced apart from each other, said fingers on said second portion being spaced apart from each other, said fingers on each of said first portion and said second portion being positioned adjacent to said second end.

4. The assembly according to claim 3, wherein each of said screws has a primary end and a secondary end, said primary end of each of said screws being positioned between each of said fingers on said second portion of said respective ring, each of said screws extending between said fingers on said first portion of said respective ring when said respective ring is in said closed position.

5. The assembly according to claim 4, wherein each of said nuts is positioned on said secondary end of said respective screw, each of said nuts having a rear surface, said rear surface of each of said nuts being tapered thereby facilitating said rear surface to move between each of said fingers on said first portion of said respective ring when a respective nut is tightened thereby urging said fingers on said first portion of said respective ring toward said fingers on said second portion of said respective ring.

6. The assembly according to claim 2, wherein each of said legs has a top end and a bottom end, each of said legs being pivotally coupled to said outer surface of a respective one of said first portion and said second portion of said respective ring at a point being located adjacent to said top end of said legs, each of said legs flaring outwardly adjacent to said bottom end of said legs to define a foot on each of said legs wherein said foot is configured to stabilize said legs on the support surface.

7. The assembly according to claim 1, wherein:
said plurality of rings includes a first ring, a second ring and a third ring;
said plurality of screws includes a first screw, a second screw and a third screw, said first screw being disposed on said first ring, said second screw being disposed on said second ring, said third screw being disposed on said third ring;
said plurality of nuts includes a first nut, a second nut and a third nut, said first nut being positioned on said first screw, said second nut being positioned on said second screw, said third nut being positioned on said third screw; and
said plurality of legs includes a set of first legs, a set of second legs and a set of third legs, each of said first legs being positioned on said first ring, each of said second legs being positioned on said second ring, each of said third legs being positioned on said third ring.

8. The assembly according to claim 7, wherein each of said first legs has a length being greater than a length of said second legs, each of said second legs having a length being greater than a length of said third legs wherein each of said first legs, said second legs and said third legs are configured to orient the fuel hose in a downwardly sloping orientation when the fuel hose is extended through each of said first ring, said second ring and said third ring.

9. A hose stand assembly for positioning a fuel hose on a tanker in a sloped orientation during refueling procedures, said assembly comprising:

a plurality of rings, each of said rings having a first portion being hingedly coupled to a second portion such that each of said rings is positionable in a closed position having said rings forming a closed loop wherein each of said rings is configured to have a fuel hose extended therethrough, each of said first portion and said second portion having a first end, a second end and an outer surface extending therebetween, said outer surface of each of said first portion and said second portion being curved between said first end and said second end such that each of said first portion and said second portion forms a semi-circle, said first end of each of said first portion and said second portion comprising a lobe, said lobe associated with said first portion pivotally engaging said lobe associated with said second portion, each of said first portion and said second portion having a pair of fingers each extending away from said outer surface, said fingers on said first portion being spaced apart from each other, said fingers on said second portion being spaced apart from each other, said fingers on each of said first portion and said second portion being positioned adjacent to said second end, said plurality of rings including a first ring, a second ring and a third ring;

a plurality of screws, each of said screws being pivotally disposed on said second portion of a respective one of said rings, said screw on a respective one of said rings releasably engaging said first portion of said respective ring for retaining said respective ring in said closed position, each of said screws having a primary end and a secondary end, said primary end of each of said screws being positioned between each of said fingers on said second portion of said respective ring, each of said screws extending between said fingers on said first portion of said respective ring when said respective ring is in said closed position, said plurality of screws including a first screw, a second screw and a third screw, said first screw being disposed on said first ring, said second screw being disposed on said second ring, said third screw being disposed on said third ring;

a plurality of nuts, each of said nuts being threadably positioned on a respective one of said screws, each of said nuts being tightenable on said respective screw to compress said first portion of a respective ring toward said second portion of said respective ring for retaining said respective ring in said closed position, each of said nuts being positioned on said secondary end of said respective screw, each of said nuts having a rear surface, said rear surface of each of said nuts being tapered thereby facilitating said rear surface to move between each of said fingers on said first portion of said receptive ring when a respective nut is tightened thereby urging said fingers on said first portion of said respective ring toward said fingers on said second portion of said respective ring, said plurality of nuts including a first nut, a second nut and a third nut, said first nut being positioned on said first screw, said second nut being positioned on said second screw, said third nut being positioned on said third screw;

a plurality of legs, each of said legs being pivotally disposed on a respective one of said first portion and said second portion of a respective one of said rings such that said legs disposed on each ring are pivotable within respective parallel planes when said ring is in said closed position, each of said legs being positionable in a deployed position having each of said legs extending downwardly from said respective ring wherein each of said legs is configured to support said respective ring above a support surface thereby supporting the fuel hose above the support surface when the fuel hose is extended through said respective ring, each of said legs having a top end and a bottom end, each of said legs being pivotally coupled to said outer surface of a respective one of said first portion and said second portion of said respective ring at a point being located adjacent to said top end of said legs, each of said legs flaring outwardly adjacent to said bottom end of said legs to define a foot on each of said legs wherein said foot is configured to stabilize said legs on the support surface, said plurality of legs including a set of first legs, a set of second legs and a set of third legs, each of said first legs being positioned on said first ring, each of said second legs being positioned on said second ring, each of said third legs being positioned on said third ring, each of said first legs having a length being greater than a length of said second legs, each of said second legs having a length being greater than a length of said third legs wherein each of said first legs, said second legs and said third legs are configured to orient the fuel hose in a downwardly sloping orientation when the fuel hose is extended through each of said first ring, said second ring and said third ring.

10. A hose stand system for positioning a fuel hose on a tanker in a sloped orientation during refueling procedures, said assembly comprising:

a fuel tanker having a fuel hose wherein said fuel hose is configured to deliver liquid fuel in said fuel tanker into a receptacle;

a plurality of rings, each of said rings having a first portion being hingedly coupled to a second portion such that each of said rings is positionable in a closed position having said rings forming a closed loop for having said fuel hose extended therethrough, each of said first portion and said second portion having a first end, a second end and an outer surface extending therebetween, said outer surface of each of said first portion and said second portion being curved between said first end and said second end such that each of said first portion and said second portion forms a semi-circle, said first end of each of said first portion and said second portion comprising a lobe, said lobe associated with said first portion pivotally engaging said lobe associated with said second portion, each of said first portion and said second portion having a pair of fingers each extending away from said outer surface, said fingers on said first portion being spaced apart from each other, said fingers on said second portion being spaced apart from each other, said fingers on each of said first portion and said second portion being positioned adjacent to said second end, said plurality of rings including a first ring, a second ring and a third ring;

a plurality of screws, each of said screws being pivotally disposed on said second portion of a respective one of said rings, said screw on a respective one of said rings releasably engaging said first portion of said respective ring for retaining said respective ring in said closed position, each of said screws having a primary end and a secondary end, said primary end of each of said screws being positioned between each of said fingers on said second portion of said respective ring, each of said screws extending between said fingers on said first portion of said respective ring when said respective ring is in said closed position, said plurality of screws including a first screw, a second screw and a third screw, said first screw being disposed on said first ring, said second screw being disposed on said second ring, said third screw being disposed on said third ring;

a plurality of nuts, each of said nuts being threadably positioned on a respective one of said screws, each of said nuts being tightenable on said respective screw to compress said first portion of a respective ring toward said second portion of said respective ring for retaining said respective ring in said closed position, each of said nuts being positioned on said secondary end of said respective screw, each of said nuts having a rear surface, said rear surface of each of said nuts being tapered thereby facilitating said rear surface to move between each of said fingers on said first portion of said receptive ring when a respective nut is tightened thereby urging said fingers on said first portion of said respective ring toward said fingers on said second portion of said respective ring, said plurality of nuts including a first nut, a second nut and a third nut, said first nut being positioned on said first screw, said second nut being positioned on said second screw, said third nut being positioned on said third screw;

a plurality of legs, each of said legs being pivotally disposed on a respective one of said first portion and said second portion of a respective one of said rings such that said legs disposed on each ring are pivotable within respective parallel planes when said ring is in said closed position, each of said legs being positionable in a deployed position having each of said legs extending downwardly from said respective ring wherein each of said legs is configured to support said respective ring above a support surface thereby supporting said fuel hose above the support surface when said fuel hose is extended through said respective ring, each of said legs having a top end and a bottom end, each of said legs being pivotally coupled to said outer surface of a respective one of said first portion and said second portion of said respective ring at a point being located adjacent to said top end of said legs, each of said legs flaring outwardly adjacent to said bottom end of said legs to define a foot on each of said legs wherein said foot is configured to stabilize said legs on the support surface, said plurality of legs including a set of first legs, a set of second legs and a set of third legs, each of said first legs being positioned on said first ring, each of said second legs being positioned on said second ring, each of said third legs being positioned on said third ring, each of said first legs having a length being greater than a length of said second legs, each of said second legs having a length being greater than a length of said third legs such that each of said first legs, said second legs and said third legs orients said fuel hose in a downwardly sloping orientation when the fuel hose is extended through each of said first ring, said second ring and said third ring wherein said fuel hose is configured to enhance delivering the liquid fuel into the receptacle.

* * * * *